United States Patent
Staniszewski et al.

(10) Patent No.: US 6,988,748 B2
(45) Date of Patent: Jan. 24, 2006

(54) FLUID COUPLING ASSEMBLY

(75) Inventors: Mike Staniszewski, Mississauga (CA); Armando Ricci, Brampton (CA); Paolo Ricci, Brampton (CA)

(73) Assignee: Martinrea Industries, Inc., Dexter, MI (US)

( * ) Notice: Subject to any disclaimer, the term of this patent is extended or adjusted under 35 U.S.C. 154(b) by 0 days.

(21) Appl. No.: 10/745,448

(22) Filed: Dec. 23, 2003

(65) Prior Publication Data

US 2005/0134043 A1    Jun. 23, 2005

(51) Int. Cl.
*F16L 25/00*    (2006.01)
*F16L 19/00*    (2006.01)

(52) U.S. Cl. .............. 285/334.2; 285/334.5; 285/332.3; 285/353

(58) Field of Classification Search ............ 285/332.3, 285/334.2, 334.5, 353
See application file for complete search history.

(56) References Cited

U.S. PATENT DOCUMENTS

| | | | | |
|---|---|---|---|---|
| 1,920,512 A | * | 8/1933 | Lamont | 285/334.2 |
| 2,310,944 A | * | 2/1943 | Douglass | 285/334.2 |
| 2,333,157 A | * | 11/1943 | Douglass | 285/334.2 |
| 2,349,081 A | * | 5/1944 | Douglass | 285/334.2 |
| 2,669,465 A | * | 2/1954 | Newell | 285/53 |
| 2,775,471 A | * | 12/1956 | Douglass | 285/332.3 |
| 3,746,376 A | * | 7/1973 | Gold | 285/334.2 |
| 5,016,920 A | * | 5/1991 | Anderson | 285/39 |
| 5,135,269 A | * | 8/1992 | Babuder | 285/328 |

FOREIGN PATENT DOCUMENTS

JP          6-101787          * 4/1994

* cited by examiner

*Primary Examiner*—James M. Hewitt
(74) *Attorney, Agent, or Firm*—Gifford, Krass, Groh, Sprinkle, Anderson & Citkowski, P.C.

(57) ABSTRACT

A fluid coupling assembly having a first and second metal tube, each tube having an outwardly flared end. A first connector includes a throughbore, a first end and a second end with a radially inwardly extending rim at the first end of the first connector. The first connector is disposed over the first tube so that the tube extends outwardly from the first end of the first connector and so that the rim registers with one side of the first tube. A second connector also includes a throughbore with a first and second end and in which the second end of the second connector is flared outwardly. The second connector is disposed over the second tube so that the second tube extends outwardly from the first end of the second connector and so that the second connector flared surface registers with one side of the second tube flared end. An annular seal member is longitudinally slidably mounted within the first connector throughbore. This seal member includes abutment surfaces at each end which register with the other sides of the first and second tubes. The second tube is internally threaded at a second end while, similarly, the second connector is externally threaded at its second end. Thus, upon tightening the first and second connectors together, the outwardly flared ends of the tubes are sandwiched in between the first connector rim, the second connector flared surface and the abutment surfaces on the seal member.

10 Claims, 1 Drawing Sheet

FLUID COUPLING ASSEMBLY

BACKGROUND OF THE INVENTION

I. Field of the Invention

The present invention relates generally to fluid couplings.

II. Description of the Prior Art

In many fluid systems, such as the hydraulic brake system of an automotive vehicle, it is essential that any fluid couplings contained within the system, as well as the fluid tubes themselves, be leak free. For this reason, many such systems utilize metal tubing which is not only capable of containing high pressure, but is also leak free unless damaged.

Many of these previously known systems utilize metal tubing having an outwardly flared portion at the end of the tube. A fluid coupling is then used to secure two flared ends of the metal tubing together in order to complete the fluid connection.

The previously known fluid connectors used in automotive brake systems typically include a three-piece design. A first fluid connector having an externally threaded portion with an outwardly flared surface at one end is disposed over each of the metal tubings so that the outwardly flared ends of each connector register with the outwardly flared portion on their respective tube. An internally threaded coupling includes a throughbore which is threaded at each end. This coupling also includes two outwardly facing annular abutment surfaces within the throughbore. Thus, when the externally threaded fluid connectors are threadably connected to the internally threaded coupling, upon tightening, the flared ends of the tube are compressed between the two externally threaded fluid connectors and the abutment surfaces formed within of the internally threaded coupling throughbore.

In order to form the coupling, both the externally threaded fluid connectors as well as the internally threaded coupling have a hexagonal outer surface to facilitate rotation and tightening of the coupling with a conventional wrench. Typically, one externally threaded fluid connector is first tightened into the fluid coupling and thereafter the second fluid connector is tightened into the other end of the internally threaded fluid coupling.

A primary disadvantage of this fluid coupling assembly, however, is that two separate tightening operations are required in order to complete the fluid coupling assembly, i.e. the first tightening operation of the first externally threaded connector to the internally threaded coupling and, secondly, tightening the second externally threaded connector to the opposite end of the internally threaded coupling. The requirement of two tightening operations thus increases the overall assembly time of the fluid coupling assembly. Furthermore, since automotive brake systems typically comprise numerous fluid coupling assemblies, the requirement of two tightening operations for each coupling assembly appreciably increases the assembly labor cost and cycle time of the vehicle.

A still further disadvantage is that these previously known coupling assemblies are both heavy and relatively long. Since the coupling assembly is oftentimes suspended by the tube itself, the weight of the coupling assembly is oftentimes suspended by the tube itself, the weight of the coupling assembly may result in tube fatigue and/or rattling. Additionally, such coupling assemblies are difficult to use in tight packaging conditions.

SUMMARY OF THE PRESENT INVENTION

The present invention provides a fluid coupling assembly which overcomes all of the above-mentioned disadvantages of the previously known devices.

In brief, the fluid coupling assembly of the present invention is designed for coupling a first and second metal tube together wherein each tube includes an outwardly flared end. Such tubing is conventional in many high-pressure systems, such as the brake system for an automotive vehicle.

A first connector includes a throughbore, a first end and a second end. The connector also includes a radially inwardly extending rim at its first end and is internally threaded at its second end.

The first connector is disposed over the first tube so that the tube extends outwardly from the first end of the first connector. In doing so, the radially inwardly extending rim registers with one side of the flared end of the first tube.

A second connector also includes a throughbore, a first end and a second end. The second connector has an outwardly flared surface at its second end.

The second connector is disposed over the second tube so that the second tube extends outwardly from the first end of the second connector. Simultaneously, the flared surface on the second connector registers with one side of the flared end of the second tube. The second connector also includes external threads adjacent its second end which are dimensioned to threadably engage the internal threads on the first connector.

An annular seal member is longitudinally slidably mounted within the first connector throughbore. This seal member has a first abutment surface which registers with a second side of the flared end of the first tube. Similarly, a second abutment surface on the seal member registers with a second side of the flared end of the second tube when the first and second connectors are threadably connected together.

The external surfaces of both the first and second connectors are hexagonal in shape to facilitate tightening of the first and second connectors together by a wrench. Upon doing so, the flared ends of the first and second tube are sandwiched in between the rim on the first connector, the flared surface at the second end of the second connector, and the two abutment surfaces on the seal member. Furthermore, the fluid coupling assembly is completed in a single tightening operation, i.e. tightening the first and second connectors together.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
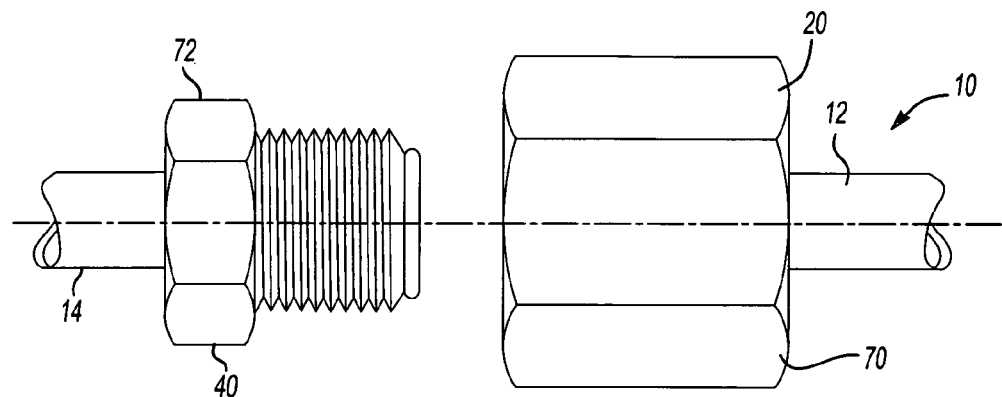
FIG. 1 is an elevational exploded view illustrating a preferred embodiment of the fluid coupling assembly of the present invention.

With reference first to FIG. 1, a preferred embodiment of the fluid coupling assembly 10 is illustrated for fluidly connecting a first metal tube 12 and a second metal tube 14 together. The tubes 12 and 14 are both made of a malleable material, such as rolled steel, copper, or even plastic, and are of the type used in hydraulic systems, such as an automotive brake system.

Figure 2:
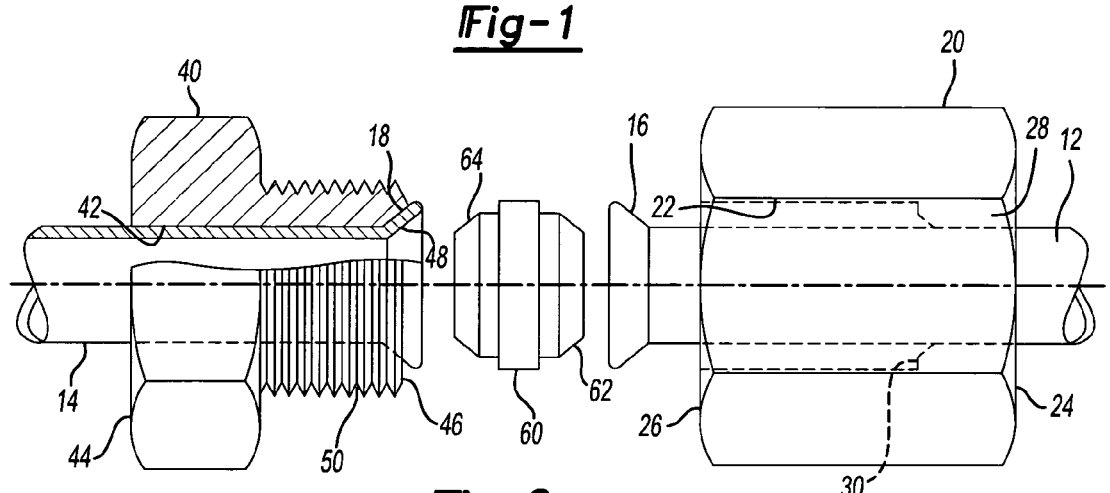
FIG. 2 is a longitudinal exploded sectional view of the preferred embodiment of the invention.

With reference now to FIG. 2, in the conventional fashion, the tube 12 has an outwardly flared end 16. Similarly, the second tube 14 also has an outwardly flared end 18. Both the size and the shape of the flared ends 16 and 18 of the tubes 12 and 14 are conventional in construction so that no further description thereof is necessary.

A first fluid connector 20 has a throughbore 22, a first end 24 and a second end 26. The first connector 20 includes a radially inwardly extending rim 28 at its first end 24 such that the diameter of the opening formed by the rim 28 is less than the diameter of the first connector throughbore 22.

The first connector 20 is disposed over the first tube 12 so that the first tube 12 extends outwardly through the first end 24 of the first connector 20. In doing so, the flared end 16 of the first tube 12 registers with an internal end 30 of the rim 28. Preferably, this end 30 of the rim 28 is flared so that it registers with and corresponds in shape to the flared end 16 of the first tube 12.

The first connector 20 also includes internal threads 32 adjacent its second end 26. These internal threads may be of any conventional width and pitch.

Still referring to FIG. 2, the fluid coupling 10 further includes a second fluid connector 40 having a throughbore 42, a first end 44 and a second end 46. The first connector 40 is disposed over the second tube 14 so that the second tube 14 extends outwardly from the second end 44 of the second connector 40.

The diameter of the second connector throughbore 42 is substantially the same or slightly greater than the outside diameter of the second tube 14. Additionally, the first connector 40 includes an outwardly flared surface 48 adjacent its first end 46. This outwardly flared surface 48 registers with and conforms in shape to the outwardly flared end 18 on the second tube 14. The second connector 40 also includes external threads 50 which are dimensioned to threadably engage the internal threads 32 on the first connector 20.

Figure 3:
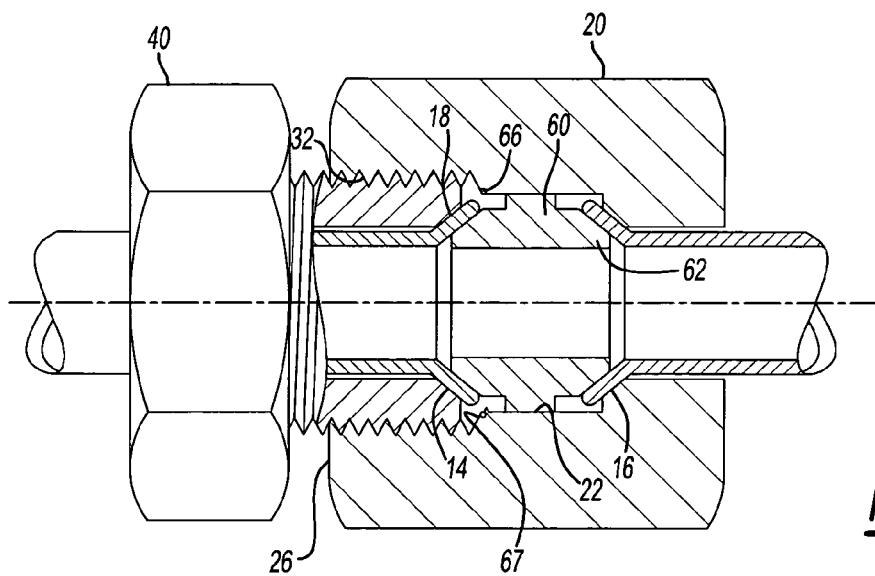
FIG. 3 is a view similar to FIG. 2, but illustrating the fluid coupling in an assembled condition.

Referring to FIGS. 2 and 3, an annular seal member 60 is longitudinally slidably disposed within the first connector bore 22. This seal member 60 includes a first beveled end 62 which both registers with and conforms in shape to the other side of the first connector-flared end 16. Similarly, a beveled end 64 is formed at the other end of the seal member 60. This beveled abutment surface 64 corresponds in shape to and registers with the other side of the flared end 18 of the second tube 14.

Preferably, the seal member 60 is retained within the interior bore 22 of the first connector by any conventional means. For example, a portion 66 of the first connector 20 may be deformed or staked as shown at 67 around the bore 22 after insertion of the seal member 60 into the first connector 20 to retain the seal member 60 within the first connector 20.

With reference now to FIG. 1, both an outer surface 70 of the first connector 20 as well as an outer surface 72 of the second connector 40 are noncircular in shape to facilitate tightening the connectors 70 and 72 together. Preferably, the surfaces 70 and 72 are polygonal and more preferably hexagonal in cross-sectional shape.

With reference now to FIG. 3, with the first connector 20 positioned over the first tube 12 and the second connector 40 positioned over the second tube 14 in the previously described fashion, the first connector 20 and second connector 40 are threadably tightened together. In doing so, the flared end 16 of the first tube 12 is compressibly sandwiched and deformed between the end 62 of the seal member 60 and the surface 30 of the first connector rim 24 thus fluidly sealing the first tube to the fluid coupling assembly 10. Simultaneously, the outwardly flared end 18 of the second tube 14 is compressibly sandwiched and deformed between the flared end 46 of the second connector 40 and the opposite abutment surface 64 of the seal member 60 thus fluidly sealing the second tube 14 to the coupling assembly 10.

The coupling assembly may be made of any conventional material, such as metal, plastics, rubber composites, as well as combinations thereof. For example, one of the connectors 20 or 40 may be made of metal, the other connector 20 or 40 made of plastic, and the seal member 60 comprising a thin-walled tube at least partially coated with a rubber or synthetic composite along the surface which contacts the tubes 12 and 14.

A primary advantage of the fluid coupling of the present invention is that the entire fluid coupling can be completed during a single tightening operation of the first connector 20 and second connector 40 together. Having described my invention, however, many modifications thereto will become apparent to those skilled in the art to which it pertains without deviation from the spirit of the invention as defined by the scope of the appended claims.

We claim:

1. A fluid coupling assembly comprising:
    a first and a second tube, each tube having an outwardly flared end made of a malleable material,
    a one-piece first connector having a throughbore, a first end and a second end, said first connector having a radially inwardly extending rim at said first end of said first connector, said first connector being disposed over said first tube so that said tube extends outwardly from said first end of said first connector and so that said rim registers with one side of said flared end of said first tube, said first connector having internal threads at said second end of said first connector,
    a one-piece second connector having a throughbore, a first end and a second end, said second connector having a flared surface at said second end of said second connector, said second connector being disposed over said second tube so that said second tube extends outwardly from said first end of said second connector and so that said second connector flared surface registers with one side of said second tube flared end, said second connector having external threads adjacent said second connector second end dimensioned to threadably engage said internal threads of said first connector,
    an annular seal member longitudinally slidably mounted in said first connector throughbore, said seal member having a first abutment surface which registers with a second side of said first tube flared end and a second abutment surface which registers with a second side of said second tube flared end,
    wherein upon threadably securing said first and second connectors together, said flared ends of said first and second tubes are sandwiched between said first connector rim, said second connector flared surface and said abutment surfaces on said seal member and comprising means for retaining said seal member in said first connector throughbore when said first and second connectors are both attached to or detached from one another.

2. The invention as defined in claim 1 wherein said first and second connectors each have a non-circular outer surface.

3. The invention as defined in claim 2 wherein said outer surface of said first and second connectors is polygonal in shape.

4. The invention as defined in claim 3 wherein said outer surface of said first and second connectors is hexagonal in shape.

5. The invention as defined in claim 1 wherein said retaining means comprises a deformation of said first connector throughbore.

6. The invention as defined in claim 1 wherein said seal member is of a one-piece metal construction.

7. The invention as defined in claim 1 wherein a diameter of said first connector throughbore is substantially the same as an outside diameter of said first tube.

8. The invention as defined in claim 1 wherein a diameter of said second connector throughbore is substantially the same as an outside diameter of said second tube.

9. The invention as defined in claim 1 wherein at least one of said first and second connectors is constructed of plastic.

10. The invention as defined in claim 1 wherein said seal member comprises a metal tube at least partially covered with a rubber composite.

* * * * *